US010310552B2

(12) United States Patent
Igarashi et al.

(10) Patent No.: US 10,310,552 B2
(45) Date of Patent: Jun. 4, 2019

(54) PROTECTIVE CASING

(71) Applicant: POWER SUPPORT CO., LTD., Tokyo (JP)

(72) Inventors: Katsushi Igarashi, Tokyo (JP); Yasuhiro Soda, Tokyo (JP)

(73) Assignee: POWER SUPPORT CO., LTD., Tokyo (JP)

( * ) Notice: Subject to any disclaimer, the term of this patent is extended or adjusted under 35 U.S.C. 154(b) by 0 days.

(21) Appl. No.: 15/576,792

(22) PCT Filed: Jul. 8, 2016

(86) PCT No.: PCT/JP2016/070311
§ 371 (c)(1),
(2) Date: Nov. 24, 2017

(87) PCT Pub. No.: WO2017/010433
PCT Pub. Date: Jan. 19, 2017

(65) Prior Publication Data
US 2018/0164847 A1 Jun. 14, 2018

(30) Foreign Application Priority Data
Jul. 13, 2015 (JP) ................. 2015-140034

(51) Int. Cl.
*H04M 1/02* (2006.01)
*H05K 5/03* (2006.01)
(Continued)

(52) U.S. Cl.
CPC ............. *G06F 1/16* (2013.01); *G06F 1/1626* (2013.01); *G06F 3/0488* (2013.01);
(Continued)

(58) Field of Classification Search
CPC combination set(s) only.
See application file for complete search history.

(56) References Cited

U.S. PATENT DOCUMENTS

D683,338 S 5/2013 Wilson et al.
D691,124 S 10/2013 Yang
(Continued)

FOREIGN PATENT DOCUMENTS

JP 2013015835 A 1/2013
JP 2014-166727 A 9/2014

OTHER PUBLICATIONS

U.S. Office Action dated Jul. 5, 2018, in connection with corresponding U.S. Appl. No. 29/550,840 (12 pgs.).
(Continued)

*Primary Examiner* — Jennifer Mehmood
*Assistant Examiner* — Deeprose Subedi
(74) *Attorney, Agent, or Firm* — Maier & Maier, PLLC

(57) ABSTRACT

[Problem] Provided is a screen protector that can be easily mounted on a mobile information terminal and is able to favorably maintain the operability of the screen at the touch of the screen while ensuring engagement strength.

[Solving Means] A protector configured to be mounted on a front face of a mobile information terminal includes a thin part configured to cover a screen of the mobile information terminal and a pair of thick parts disposed on upper and lower sides of the thin part and having a greater thickness than the thin part. The thin part includes a screen cover configured to cover the screen and a thin engaging part extending from the screen cover toward a side face of the mobile information terminal and configured to engage with the side face. The thick parts each include a thick engaging part connected to the thin engaging part and configured to engage with the side face.

9 Claims, 4 Drawing Sheets

PERSPECTIVE VIEW

(51) Int. Cl.
*G06F 1/16* (2006.01)
*G06F 3/0488* (2013.01)
*H04M 1/18* (2006.01)
*A45C 11/00* (2006.01)

(52) U.S. Cl.
CPC ......... *H04M 1/0266* (2013.01); *H04M 1/185* (2013.01); *A45C 2011/002* (2013.01); *A45C 2011/003* (2013.01); *G06F 2200/1634* (2013.01)

(56) References Cited

U.S. PATENT DOCUMENTS

| | | |
|---|---|---|
| D697,060 S | 1/2014 | Yang |
| D697,504 S | 1/2014 | Yang |
| D706,253 S | 6/2014 | Simmer |
| D709,059 S | 7/2014 | Kim et al. |
| D709,060 S | 7/2014 | Melanson et al. |
| D709,061 S | 7/2014 | Borra et al. |
| 9,061,542 B1 | 6/2015 | Huang |
| 9,063,699 B1 | 6/2015 | Huang |
| D753,099 S | 4/2016 | Kim |
| D775,100 S | 12/2016 | Teruyama |
| 2013/0002133 A1 | 1/2013 | Jin et al. |
| 2013/0042581 A1* | 2/2013 | Holben ................ H04B 1/3888 53/473 |
| 2013/0113348 A1* | 5/2013 | Holben .................... H05K 5/03 312/223.1 |
| 2013/0271897 A1 | 10/2013 | Limber et al. |
| 2013/0273944 A1 | 10/2013 | Wilson et al. |
| 2014/0247405 A1 | 9/2014 | Jin et al. |
| 2016/0062495 A1 | 3/2016 | Huang |
| 2016/0285497 A1 | 9/2016 | Roberts et al. |
| 2016/0370827 A1 | 12/2016 | Jin et al. |

OTHER PUBLICATIONS

Notice of Allowance dated Jan. 24, 2019 in corresponding U.S. Appl. No. 29/550,840; 11 pages.

* cited by examiner

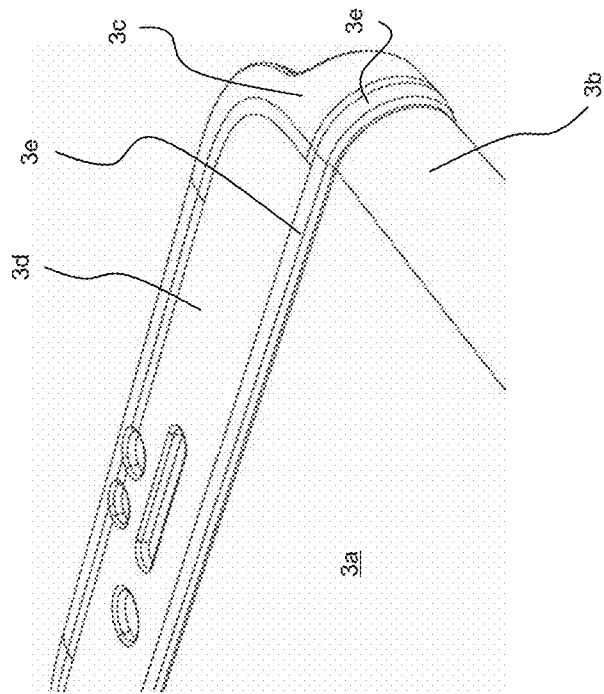
FIG. 2B ENLARGED VIEW OF REGION X
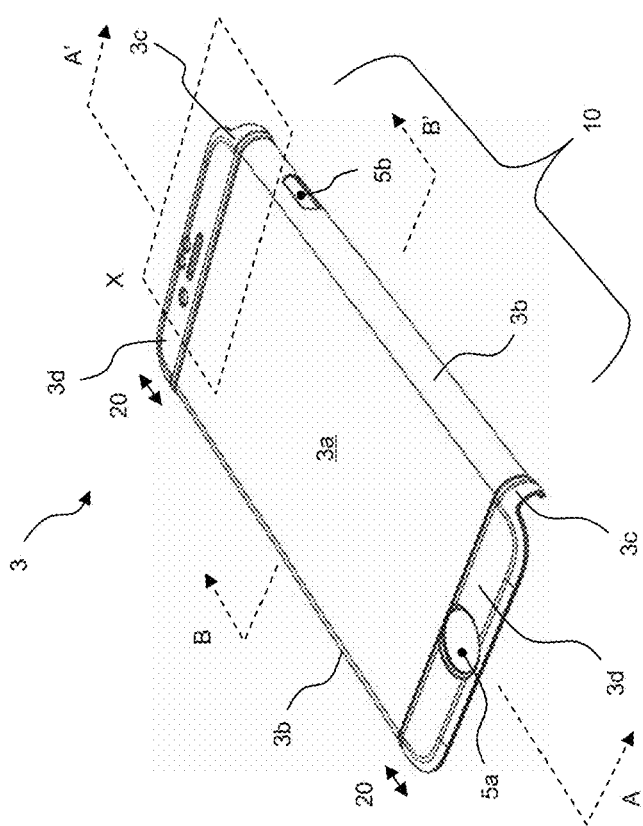
FIG. 2A PERSPECTIVE VIEW

SECTIONAL PERSPECTIVE VIEW
TAKEN ALONG LINE B-B'

ENLARGED PARTIAL SECTIONAL VIEW
TAKEN ALONG LINE A-A'

PROTECTIVE CASING

TECHNICAL FIELD

The present invention relates to a protector for use with screen-equipped mobile information terminals, including smartphones and tablet terminals.

BACKGROUND ART

Mobile information terminals, including smartphones and tablet terminals, are commercially available from various companies, can be intuitively operated using a screen, and are being used by many users due to the high portability thereof.

Many users carry a smartphone or tablet terminal in a pocket or bag, and such a smartphone or tablet terminal is more likely to be damaged. The screen is often broken depending on the conditions.

For this reason, protection films configured to be attached to the screen of a smartphone or tablet terminal to protect the screen are being widely used.

Patent Literature 1 discloses a frame-shaped protection film attachment assisting tool that is able to position a protection film when attaching the protection film to the screen of a mobile device.

CITATION LIST

Patent Literature

[Patent Literature 1] Japanese Unexamined Patent Application Publication No. 2014-166727

SUMMARY OF INVENTION

Technical Problem

However, it is not easy to neatly attach a protection film to the screen. To neatly attach a protection film, it is necessary to remove dirt by wiping the screen using soft cloth, to position the protection film in a well-dried state, and to attach the protection film while pressing it using a spatula or the like so that bubbles do not enter. The entry of bubbles is unpreferable, since it not only worsens the appearance but also makes the protection film more likely to be peeled and thus dirt or dust may enter the bubbles. Since stores are providing protection film attachment service on a chargeable basis, users recognize the need for a protection film when they buy a smartphone. However, they seem to feel that it would take time and effort to attach a protection film. For this reason, consideration has been made on how quickly a protection film can be attached neatly, as disclosed in Patent Literature 1.

Unfortunately, no matter how quickly a protection film is attached neatly, it is difficult to prevent a finger from being caught in the step between the end face of the protection film and the screen or to prevent the protection film from being peeled due to aging degradation. Unfavorably, each time the film is peeled, the user must buy a new protection film.

For this reason, the present inventor has conceived of a protector in which a screen cover configured to cover the screen of a smartphone and engaging parts configured to engage with the side faces of the smartphone are integrally formed. However, this idea has the following problems: thinning the protector so that the operability of the screen at the touch of the screen can be favorably maintained causes a shortage of the strength of engagement of the protector with the sides; thickening the protector to obtain sufficient engagement strength impairs the operability of the screen at the touch of the screen and upsizes the protector-equipped terminal as a whole.

The present invention has been made in view of the foregoing, and an object thereof is to provide a screen protector that can be easily mounted on a mobile information terminal and is able to favorably maintain the operability of the screen at the touch of the screen while ensuring engagement strength.

Solution to Problem

The present invention provides a protector configured to be mounted on a front face of a mobile information terminal includes a thin part configured to cover a screen of the mobile information terminal and a pair of thick parts disposed on upper and lower sides of the thin part and having a greater thickness than the thin part. The thin part includes a screen cover configured to cover the screen and a thin engaging part extending from the screen cover toward a side face of the mobile information terminal and configured to engage with the side face. The thick parts each include a thick engaging part connected to the thin engaging part and configured to engage with the side face.

A point of the present invention is that the protector includes the thin part configured to cover the screen of the mobile information terminal and the pair of thick parts disposed on the upper and lower sides of the thin part and having the greater thickness than the thin part; the thin part includes the screen cover configured to cover the screen and the thin engaging part extending from the screen cover toward the side face of the mobile information terminal and configured to engage with the side face; and the thick parts each include the thick engaging part connected to the thin engaging part and configured to engage with the side face. This protector can be easily mounted on the mobile information terminal without having to position it as has been done and in such a manner that the entry of bubbles is prevented. Also, no step exists between the screen cover and screen, preventing a finger from being caught in such a step or preventing the protector from being peeled due to aging degradation. Also, no step exists between the screen cover and thin engaging part, allowing a finger to be smoothly moved to the side face and preventing a finger from unfavorably being caught in such a step.

If the entire protector has a thickness similar to that of the thin part, the protector cannot firmly engage with the mobile information terminal due to a lack of strength. On the other hand, if the entire protector has a thickness similar to that of the thick part, the operability of the screen at the touch of the screen is degraded. Also, the terminal having such a protector mounted thereon has large size as a whole and therefore is difficult to carry with one hand. To solve these contradictory problems, the screen cover and thin engaging part of the thin part are formed so as to be thin. Thus, the operability of the screen at the touch of the screen can be favorably maintained. Also, the thick engaging parts of the thick parts are allowed to firmly engage with the four corners of the mobile information terminal.

Thus, even if the side faces of the mobile information terminal are also formed of a touchscreen, the operability of the touchscreen forming the sides can also be favorably maintained, since the thin engaging part 3*b* engages with the touchscreen. This is a secondary effect of the present invention.

As seen above, unlike a conventional protection film, the protector provided by the present invention achieves both the firm engagement of the protector with the mobile information terminal and favorable operability on the basis of the idea of mounting the protector on the mobile information terminal rather than attaching it thereto.

Various embodiments of the present invention are described below. The embodiments below can be combined with each other.

Preferably, the thick parts each include a base disposed so as to be flush with the screen cover, and the thick engaging parts are disposed so as to extend from the bases toward the side face of the mobile information terminal.

Preferably, the thin part and the thick parts are connected through a slope.

Preferably, the thin engaging part and the thick engaging parts each have a bent surface corresponding to a shape of the side face of the mobile information terminal.

Preferably, the screen cover and the thin engaging part have a substantially identical thickness.

Preferably, the screen cover and the thin engaging part are 0.2 to 0.4 mm thick.

Preferably, the thick engaging parts are 0.5 to 1.0 mm thick.

BRIEF DESCRIPTION OF DRAWINGS

FIG. 2A is a perspective view of the protector, and FIG. 2B is an enlarged view of a region X in FIG. 2A.

DESCRIPTION OF EMBODIMENTS

Now, an embodiment of the present invention will be described. However, the embodiment below is illustrative only and does not limit the scope of the present invention.

The embodiment of the present invention will be described with reference to FIGS. 1 to 4. Various features described in the embodiment below can be combined with each other. Inventions are established for the respective features.

Figure 1:
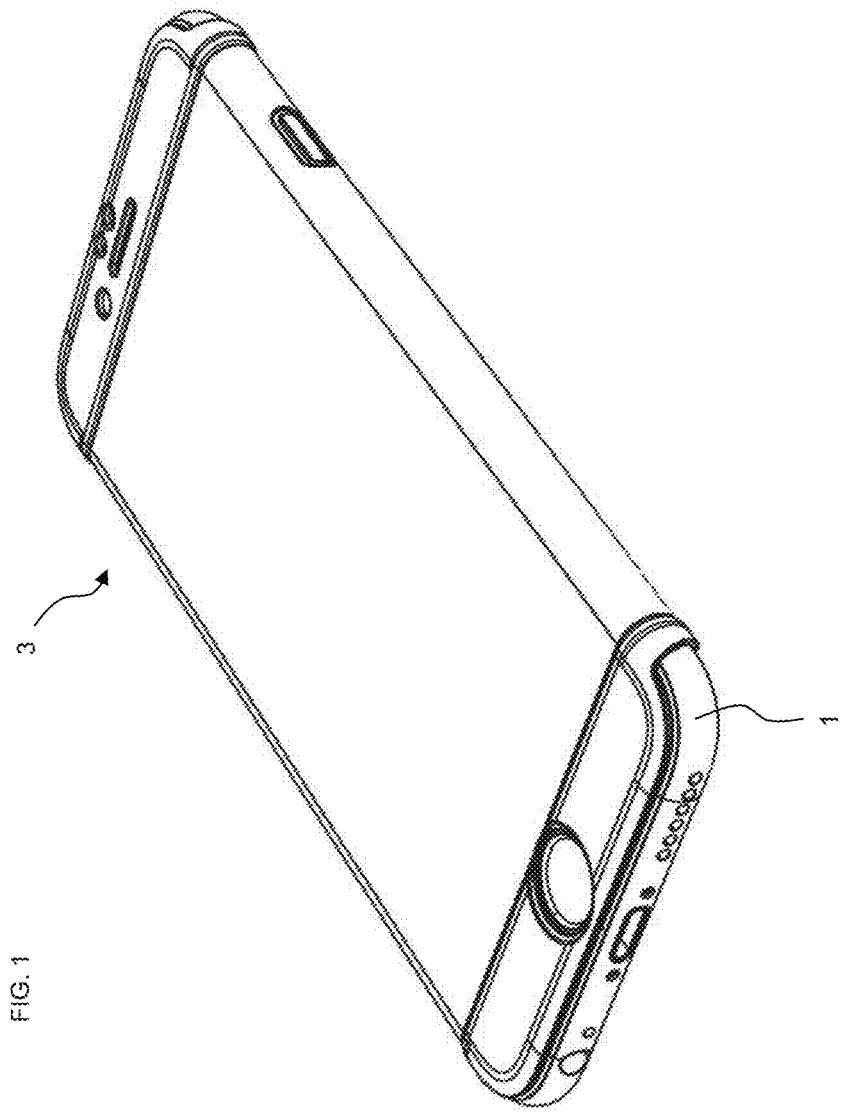
FIG. 1 is a perspective view showing a state in which a protector is mounted on the front face of a mobile information terminal.

FIG. 1 is a perspective view showing a state in which a protector 3 is mounted on the front face of a mobile information terminal 1. For example, the mobile information terminal 1 is iPhone 6 available from Apple Inc. The protector 3 is mounted on the mobile information terminal 1 so as to cover the front and side faces of the mobile information terminal 1.

FIG. 2A is a perspective view of the protector 3, and FIG. 2B is an enlarged view of a region X in FIG. 2A. As shown in FIG. 2A, the protector 3 is formed of, for example, polycarbonate and includes a thin part 10 for covering a screen and a pair of thick parts 20 that are disposed on the upper and lower sides of the thin part 10 and are thicker than the thin part 10. The thin part 10 and thick parts 20 are connected through slopes 3e (to be discussed later). The thin part 10 includes a screen cover 3a for covering a screen and thin engaging parts 3b extending from the screen cover 3a toward the side faces of the mobile information terminal 1 and configured to engage with the side faces of the mobile information terminal 1. The thick parts 20 each include a base 3d disposed so as to be flush with the screen cover 3a and a thick engaging part 3c extending from the base 3d toward a side face of the mobile information terminal 1 and configured to engage with the side face of the mobile information terminal 1. Thus, as shown in FIG. 2B, the screen cover 3a and bases 3d are connected through the slopes 3e, and the thin engaging parts 3b and thick engaging parts 3c are connected through the slopes 3e as well. The thin engaging parts 3b and thick engaging parts 3c are bent in accordance with the shapes of the side faces of the mobile information terminal 1 at the left and right ends and configured to engage with the left and right side faces of the mobile information terminal 1.

The screen cover 3a aims to protect a screen. The thin engaging parts 3b aim to protect the side faces of the mobile information terminal 1 while engaging with the side faces. These parts are preferably 0.2 to 0.4 mm thick. This is because both shock resistance and screen sensitivity must be achieved. If these parts are made thicker, they would resist greater shock; however, if these parts are made too thick, they would reduce the sensitivity of the screen to a touch. The screen cover 3a is held over the screen by the thin engaging parts 3b. As used herein, the term "the screen cover 3a is held over the screen" includes not only a state in which it adheres to the screen but also an aspect in which it is held so as to be spaced from the screen by a predetermined distance. Since the protector 3 formed of polycarbonate transmits light, the screen can be visually recognized through the screen cover 3a.

The bases 3d aim to protect regions other than the screen in the front face of the mobile information terminal 1. The thick engaging parts 3c aim to protect the side faces while firmly engaging with the side faces. These parts are preferably 0.5 to 1.0 mm thick. Since the thin engaging parts 3b cannot firmly engage with the mobile information terminal 1 due to a lack of strength, the thick engaging parts 3c are formed so as to be thicker than the thin engaging parts 3b and thus can be firmly engaged with the four corners of the mobile information terminal 1.

The protector 3 has notches 5a, 5b in positions of side faces thereof corresponding to an operation button and a connector disposed on side faces of the mobile information terminal 1.

Figure 3B:
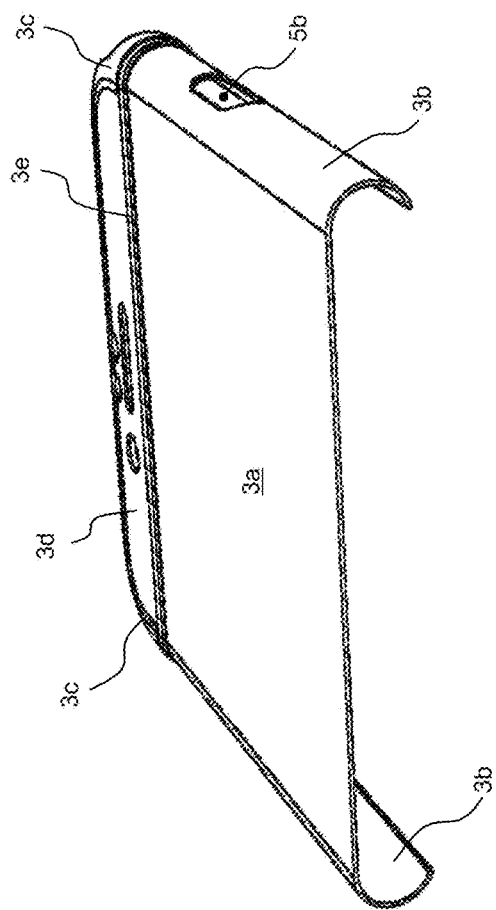
FIG. 3B is a sectional perspective view taken along line B-B' in FIG. 2A.
Figure 3A:
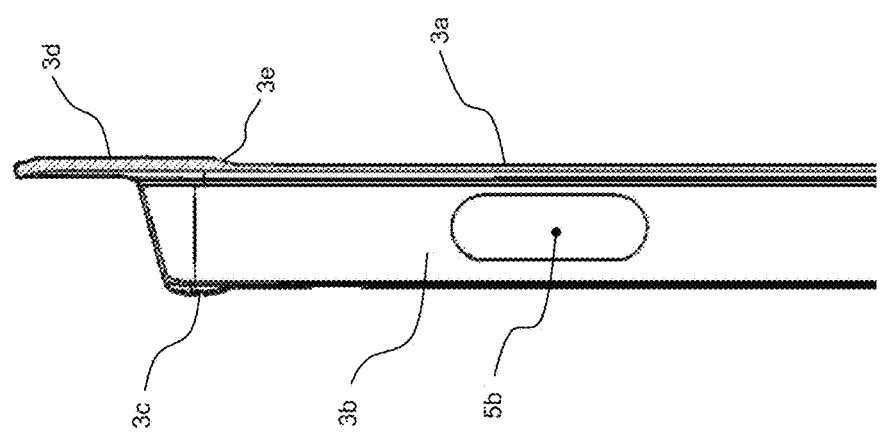
FIG. 3A is an enlarged partial sectional view taken along line A-A' in FIG. 2A.

FIG. 3A is an enlarged partial sectional view taken along line A-A' in FIG. 2A. FIG. 3B is a sectional perspective view taken along line B-B' in FIG. 2A. As shown in FIG. 3A, the base 3d is thicker than the screen cover 3a, and both are connected through the slope 3e. On the other hand, as shown in FIG. 3B, the screen cover 3a and thin engaging parts 3b have substantially the same thickness and are connected not through slopes 3e.

Figure 4:
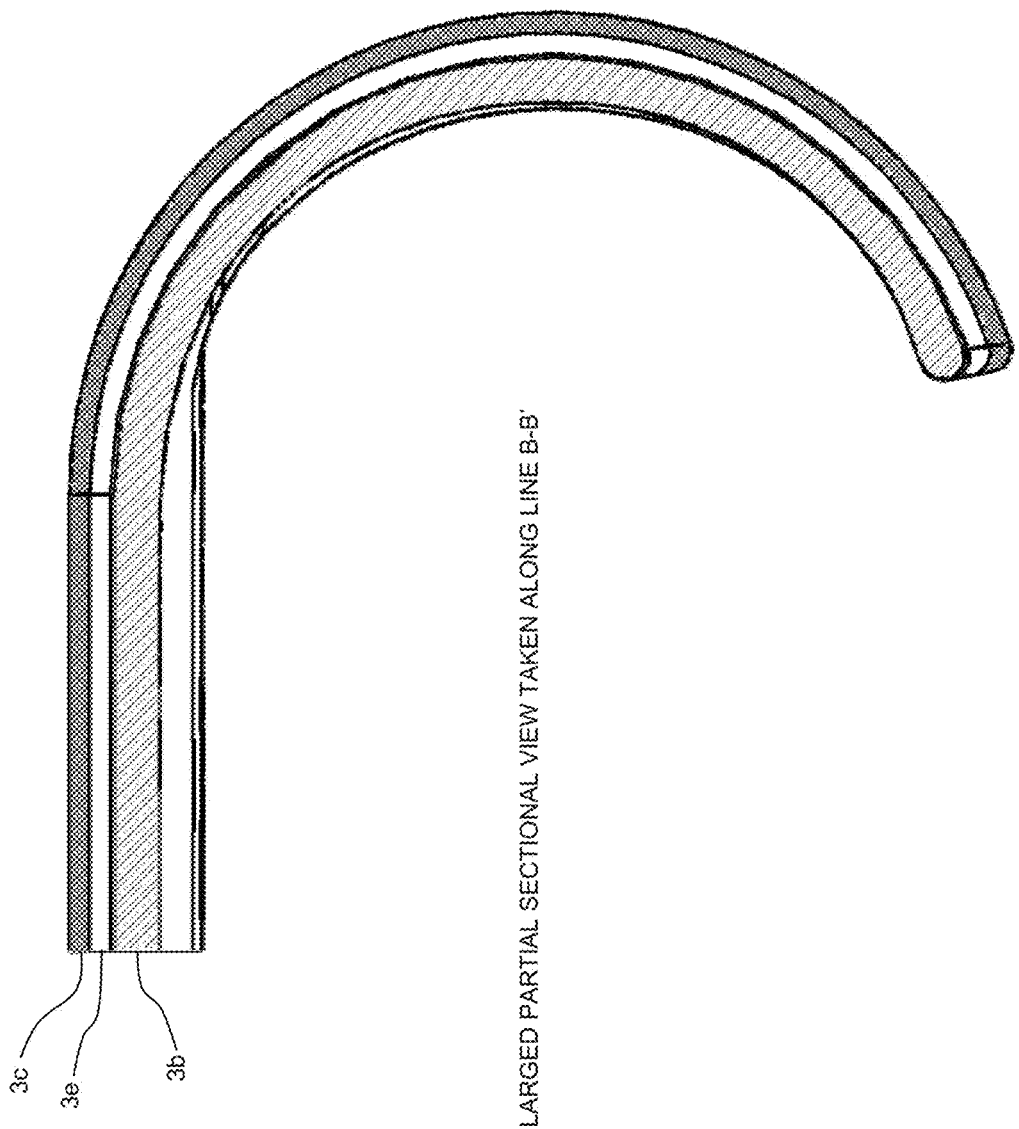
FIG. 4 is an enlarged partial sectional view taken along line B-B' in FIG. 2A.

FIG. 4 is an enlarged partial sectional view taken along line B-B' in FIG. 2A. The lower hatched thin engaging part 3b and the upper hatched thick engaging part 3c are connected through the slope 3e. The thickness ratio between the thin engaging part 3b and thick engaging part 3c is preferably in a range of 1:2.5 to 1:5.

According to the above configuration, when the protector 3 is pressed against the front face of the mobile information terminal 1, the thin engaging parts 3b and thick engaging parts 3c are engaged with the side faces of the mobile information terminal 1 and fixed thereto, and the screen cover 3a formed seamlessly with the thin engaging parts 3b is held on the screen so that the screen is protected. Thus, unlike a conventional protection film, the protector 3 can be easily mounted on the terminal without having to worry about bubbles and without having to position the protector. Also, no step exists between the screen cover 3a and screen, preventing a finger from being caught in such a step or preventing the protector from being peeled due to aging degradation. Thus, once the protector 3 is mounted, dirt or dust no longer enters. Also, unlike in a conventional protection film, the screen cover 3a does not have to have an attachment surface to the mobile information terminal 1. As used herein, the term "attachment surface" refers to a surface to be attached to the screen of the mobile information terminal 1 and, more specifically, refers to a sealant or glue surface or a surface where the material itself adsorbs to the screen of the mobile information terminal. Also, even if the protector 3 is mounted on a mobile information terminal including a screen that is formed of glass and is rounded (treated so that the edges of glass are curved), such as iPhone6, it is able to reliably protect the screen including the curved portions.

Also, the screen cover 3a and thin engaging parts 3b are able to favorably maintain the operability of the screen at the touch of the screen, while the thick engaging parts 3c are able to firmly engage with the four corners of the mobile information terminal 1. Thus, even if the side faces of the mobile information terminal 1 are also formed of a touchscreen, the operability of the touchscreen forming the side faces can also be favorably maintained, since the thin engaging parts 3b engage with the touchscreen.

While the embodiment of the present invention has been described, the present invention is not limited thereto. For example, the screen cover 3a and thin engaging parts 3b may be less than 0.2 mm thick, and the bases 3d and thick engaging parts 3c may be more than 1.0 mm thick. The thickness ratio between the thin engaging part 3b and thick engaging part 3c may be lower than 1:2.5 or higher than 1:5. The protector 3 may be formed of a material other than polycarbonate. For example, the screen cover 3a and thin engaging parts 3b may be formed of different materials. Also, the protector 3 may be used along with a protector that is configured to be mounted on the rear face of the mobile information terminal 1. In this case, the rear face of the mobile information terminal 1 can also be protected.

While the screen cover 3a and bases 3d are connected through the slopes 3e and the thin engaging parts 3b and thick engaging parts 3c are also connected through the slopes 3e, these parts may be seamlessly formed, or continuously formed, or integrally formed. For example, instead of providing the bases 3d, the screen cover 3a may be extended to regions beyond the screen, and the thick engaging parts 3c may be formed so as to extend from the extended regions of the screen cover 3a toward the side faces of the mobile information terminal 1 and to engage with the side faces of the mobile information terminal 1. In this case, the thick parts 20 include the thick engaging parts 3c connected to the thin engaging parts 3b and configured to engage with the side faces of the mobile information terminal 1. Also, boundaries may exist between the screen cover 3a and thin engaging parts 3b. For example, if the protector is formed by double-molding or the like, boundaries occur between the two resins. In this case, the thin engaging parts 3b only has to be formed so as to extend from the screen cover 3a toward the side faces of the mobile information terminal 1.

DESCRIPTION OF REFERENCE SIGNS

1: mobile information terminal, 3: protector, 3a: screen cover, 3b: thin engaging part, 3c: thick engaging part, 3d: base, 3e: slope, 5a, 5b: notch, 10: thin part, 20: thick part

The invention claimed is:

1. A protector configured to be mounted on a front face of a mobile information terminal, comprising:
a thin part configured to cover a screen of the mobile information terminal; and
a pair of thick parts disposed on upper and lower sides of the thin part and having a greater thickness than the thin part, wherein
the thin part comprises:
a screen cover configured to cover the screen; and
a thin engaging part extending from the screen cover toward a side face of the mobile information terminal and configured to engage with the side face of the mobile information terminal, and
the thick parts each comprise:
a base parallel to the screen cover; and
a thick engaging part disposed so as to extend from the bases toward the side face of the mobile information terminal,
the screen cover and each of the bases of the thick parts are provided on the front face of the mobile information terminal,
the thin engaging part and the thick engaging part are provided on side face of the mobile information terminal,
the thick engaging part is connected to the thin engaging part and configured to engage with the side face of the mobile information terminal,
a cross section of the thin engaging part parallel to a direction and perpendicular to the screen cover is arcuate, the direction is a direction from one side face of the mobile information terminal to the other side face of the mobile information terminal, and
a cross section of the thick engaging part parallel to the direction and perpendicular to the screen cover is arcuate.

2. The protector of claim 1, wherein the thin part and the thick parts are connected through a slope.

3. The protector of claim 1, wherein the thin engaging part and the thick engaging parts each have a bent surface corresponding to a shape of the side face of the mobile information terminal.

4. The protector of claim 1, wherein the screen cover and the thin engaging part have a substantially identical thickness.

5. The protector of claim 1, wherein the screen cover and the thin engaging part are 0.2 to 0.4 mm thick.

6. The protector of claim 1, wherein the thick engaging parts are 0.5 to 1.0 mm thick.

7. The protector of claim 1, wherein each of the bases of the thick parts includes one side and the other side provided with the thick engaging part respectively,
the thin part and each of the thick parts are connected through a slope,
each of the slopes is configured to extend from one of the thick engaging parts provided with the one side of the base to the other of the thick engaging parts provided with the other side of the base through the base.

8. The protector of claim 1, wherein a vertical width of the thick engaging part is shorter than a vertical width of the base.

9. The protector of claim 8, wherein a vertical width of the thick engaging part is shorter than a vertical width of the bases.

* * * * *